W. J. BURKE.
SIGNALING DEVICE FOR MOTOR VEHICLES.
APPLICATION FILED JAN. 23, 1909.
1,133,003.
Patented Mar. 23, 1915.
2 SHEETS—SHEET 1.
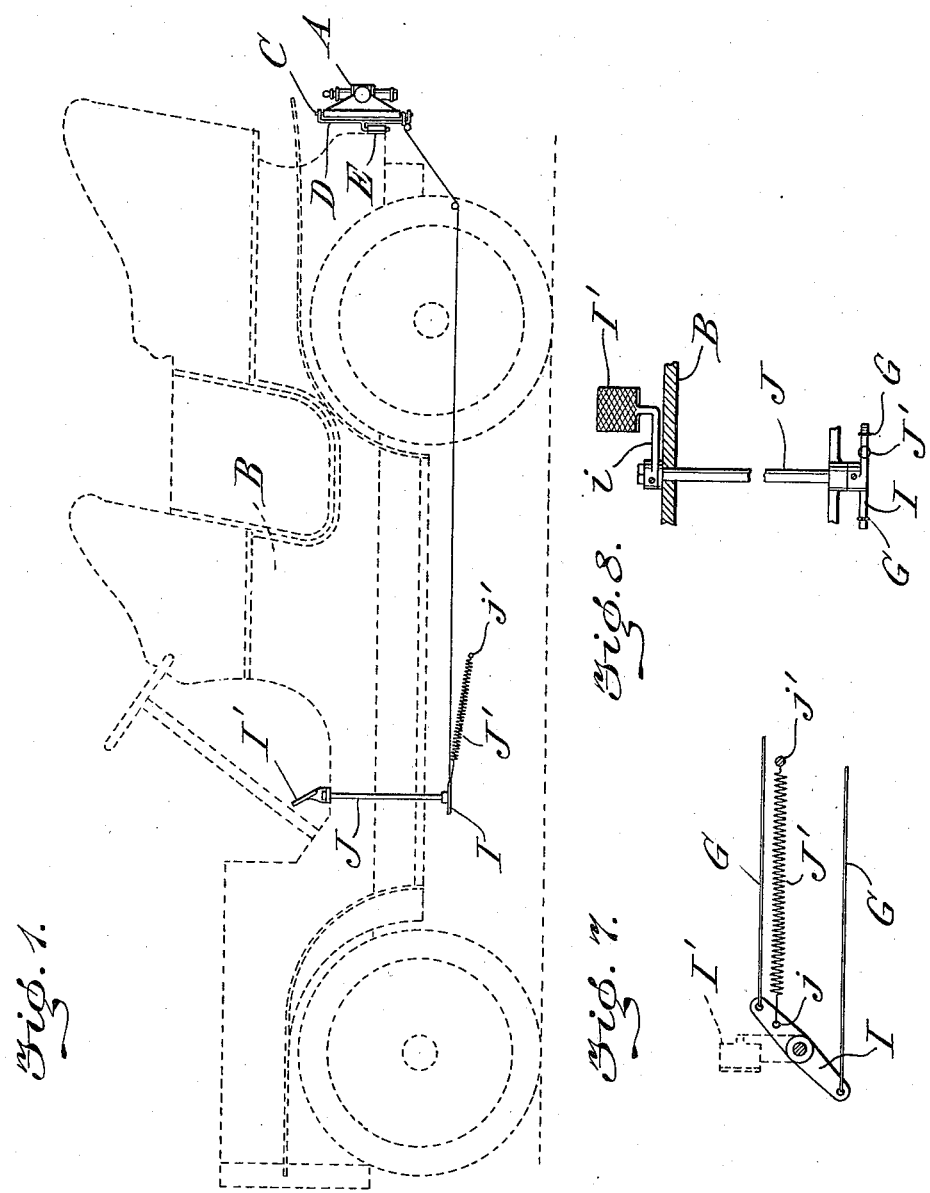
WITNESSES
INVENTOR
William J. Burke
BY
ATTORNEYS

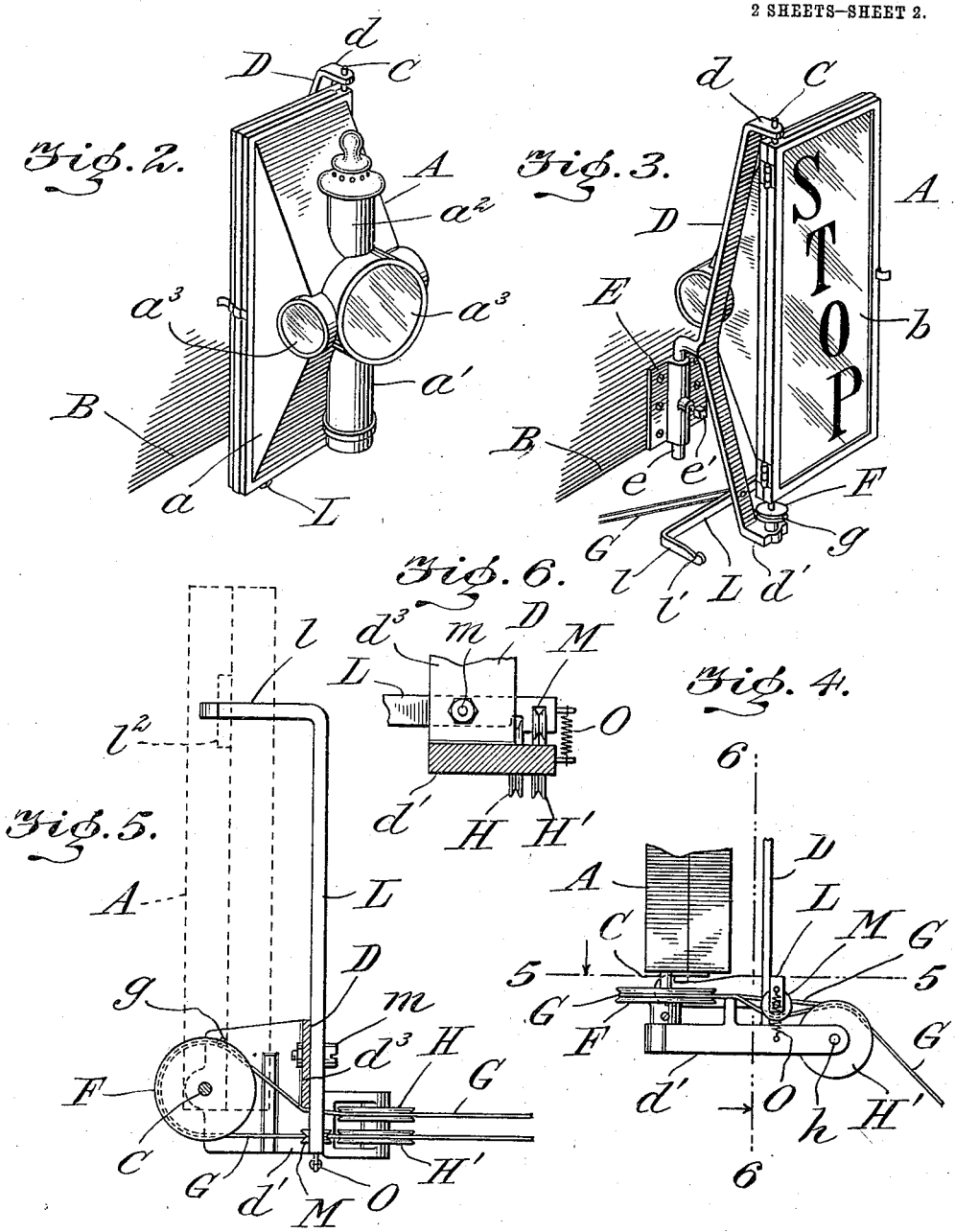

UNITED STATES PATENT OFFICE.

WILLIAM J. BURKE, OF NEW YORK, N. Y.

SIGNALING DEVICE FOR MOTOR-VEHICLES.

1,133,003. Specification of Letters Patent. Patented Mar. 23, 1915.

Application filed January 23, 1909. Serial No. 473,800.

*To all whom it may concern:*

Be it known that I, WILLIAM J. BURKE, a citizen of the United States, residing in the city of New York, borough of Manhattan, county and State of New York, have invented a certain new and useful Signaling Device for Motor-Vehicles, of which the following is a specification.

This invention is a signaling device for vehicles generally, but because of its particular adaptability to automobiles and motor driven vehicles, it will be described hereinafter in connection with such a vehicle.

The invention of the present application is designed, more particularly, as an improvement upon the signaling device disclosed in a prior application filed by me on Dec. 28, 1908, Serial No. 469,626. It is desired to state, however, that the present invention is not to be confined to use in connection with the particular form of illuminated signal of the prior application, for the reason that it may be used in connection with signals generally.

Experience has shown that it is desirable to positively lock the signaling device in its normal position, for the reason that it may become moved out of position either by the motion or the jarring of the vehicle to which it is applied, or for various other causes. Accordingly, I have provided means for retaining or locking the signaling device in a locked position, and said retaining means operates in connection with the illuminated signal of the prior application to expose the "tail lights" of a motor driven vehicle normally to view. Furthermore, the retaining or locking means of the present invention operates in conjunction with the signal operating means in such manner that the retaining means is operated automatically to release the signal, and thereafter said signal is moved to expose a sign to the view of a driver or chauffeur in a vehicle following the one equipped with my signaling device.

The invention embodies other features of novelty which will be hereinafter fully described.

In the accompanying drawings I have illustrated one practical embodiment of the invention, but the construction shown therein is to be understood as illustrative, only, and not as defining the limits of the invention.

Figure 1 is a side view illustrating my signaling device applied to an automobile, the latter being shown in dotted lines. Fig. 2 is a detail perspective view on an enlarged scale of the signaling device in its normal position. Fig. 3 is a perspective view illustrating the signal adjusted to position for displaying the warning. Fig. 4 is an enlarged view in side elevation of means for supporting and operating the signal and the latch mechanism therefor. Fig. 5 is a horizontal section showing certain parts in plan, the plane of the section being indicated by the dotted line 5—5 of Fig. 4. Fig. 6 is a vertical detail cross sectional view on the line 6—6 of Fig. 4. Figs. 7 and 8 are detail views of parts of the devices for operating the signal.

The signal shown in the drawings is similar in material respects to the device disclosed in the prior application to which reference has been made. Said signal, A, is shown as consisting of an illuminated sign comprising a casing, $a$, adapted to contain a lamp or other means for illuminating the signal and a transparent panel, $b$, the latter being inscribed with a warning or signal, such as the word "stop" shown in Fig. 3. Casing, $a$, of the signal is provided with a lamp font $a'$, the chimney, $a^2$, and a plurality of colored glasses, $a^3$. The detailed construction of signal, A, is not a material part of the present invention, and the right is reserved of modifying the construction of said signal as demanded by circumstances.

The signal is rotatably mounted at the rear part of vehicle, B, and for this purpose the signal is provided with pivots, or a rock shaft, indicated at C. The upper pivot, or the upper part of rock shaft is supported in a bearing, $d$, of a bracket, D, whereas the lower pivot, or the lower part of the rock shaft is mounted in a lug, $d'$, at the lower part of said bracket, D, whereby signal, A, is adapted to turn from the position of Fig. 2 into the position of Fig. 3, or vice versa. Bracket, D, is shown as having a rearwardly and downwardly extending arm, $e$, which is supported in a fixture, E, adapted to be fastened to the rear part of a vehicle, substantially as shown in Fig. 3, a binding screw, $e'$, being employed for holding said bracket securely within the fixture. The lower pivot, or the lower part of rock shaft, C, is provided with a pulley, F, around which passes a chain or cable, G, said cable being fastened as at $g$ to said pulley, F. The fastening, $g$, may be in the form of a screw, bolt or other device, for the purpose of rigidly attaching said cable to the pulley at a point intermediate the ends of the cable. The lower lug, $d'$, of supporting bracket, D, is adapted to support the shaft, $h$, for a plurality of direction pulleys, H, H′, and over said direction pulleys passes the two lengths of chain or cable, G, as shown more clearly in Figs. 4 and 5. Said cable or chain extends forwardly from signal, A, below the body and running gear of an automobile or other motor driven vehicle, and the forward ends of said cable or chain, G, are fastened to a lever, I, see Fig. 7. This lever is secured firmly to the lower end of a vertical rock shaft, J, which passes through the floor of vehicle, B, and to the upper part of said rock shaft is secured an arm, $i$, of a treadle, I′, or other suitable operating device, whereby said shaft, J, and lever, I, may be turned in one direction for the purpose of imparting movement to cable or chain, G. The signal, A, is held normally in the position of Fig. 2 by the action of a spring, J′, herein shown as having one end attached to lever, I, as at $j$, while its other end is anchored on a suitable part of the vehicle, as at $j'$, see Fig. 7. The spring acts on lever, I, to pull it into the position of Fig. 7, thus exerting strain on one strand of cable, G, and turning pulley, F, to the position of Fig. 5, whereby signal, A, is normally moved into the position of Figs. 1 and 2 for the purpose of displaying the "tail lights" on the vehicle. When the sign is to be displayed for the purpose of conveying the warning to the driver or chauffeur of the vehicle following the one equipped with my new signal, the operator applies pressure, by the foot, to treadle, I′, thus turning lever, I, against the tension of spring, J′, and moving one strand of cable, G, whereby pulley, F, is turned and signal, A, is swung from the positions of Figs. 1 and 2 into the position of Fig. 3.

An important feature of the present invention is a latch, L, adapted for engagement directly with signal, A, for the purpose of retaining it in the normal position of Figs. 1 and 2. Said latch is shown in Figs. 3 to 6, inclusive, in the form of a lever having an angular arm, $l$, the free end of which is notched or formed with a beak, $l'$, the latter being adapted for engagement with a keeper, $l^2$, provided on the bottom portion of signal, A, said keeper being in the form of a plate, as shown in dotted lines in Fig. 5. The latch or lever, L, extends across an upstanding part, $d^3$, on the lower lug, $d'$, of bracket, D, and said latch is pivotally attached to said upstanding part, $d^3$, by a screw or pin, $m$. The latch, it will be observed, is pivoted intermediate its ends, and on the short arm of said latch is mounted the sheave, M, which is normally in engagement with one strand or length of cable, G, see Fig. 4. To the short arm of said latch is connected a spring, O, the lower end of which is anchored on lower lug, $d'$, of the supporting bracket, and this spring acts to normally pull down one end of latch, L, so as to retain pulley, M, in engagement with a lead of cable, G. The action of spring, O, raises the long arm of latch, L, so as to secure interlocking engagement between the notched arm, $l$, of said latch and the keeper, $l^2$, of signal, A, but it also depresses the short arm of latch, L, thereby causing sheave or pulley, M, to force downwardly one lead of cable, G, in the manner shown in Fig. 4. Now when the operator applies pressure to treadle, I′, and shaft, J, and lever, I, are turned, spring, J′, is distended and one lead of cable, G, is placed under tension, thereby straightening that part of the cable between sheave, H′, and pulley, F. The effect of this operation is to raise pulley, M, and turn latch, L, on its pivot, $m$, thus depressing the hooked arm of the latch from engagement with signal, A. The pull of the cable, G, on pulley, F, turns signal, A, into the position of Fig. 3, thus displaying the sign, $b$. The sign of said signal, A, is of such character that it may readily be distinguished and read in the day time for some distance in rear of vehicle, B, and by illuminating said sign, it can be read with equal facility at night. When pressure is removed from treadle, I′, spring, J′, acts on lever, I, to return the treadle to its normal position and to swing signal, A, back to the position of Figs. 1 and 2. During this return movement of signal, A, the tension on one lead of cable, G, is slackened, and spring, O, acts on latch, L, to raise its hooked end into the path of keeper, $l^2$, whereby as the signal is returned to its normal position the latch engages automatically with the keeper of said signal. At the same time, treadle, I′, is returned to normal position so that the apparatus is ready for operation again when required.

The latch operates to retain signal, A, firmly in the position of Figs. 1 and 2, so that it cannot be displaced by the motion of the vehicle or by jarring thereof, and said latch provides a means for positively locking the signal in its normal position. When the signal occupies said normal position, and is illuminated during the night time, the lenses or glasses, $a^3$, will display the warning signal, the device serving the purposes of a "tail light" under these conditions.

Having thus fully described the invention, what I claim as new, and desire to secure by Letters Patent is:—

1. In a signal device of the class described, a rotatable sign, means for supporting it for movement, on a vertical axis and in a position normally concealed from view, a spring latch operating to retain the sign in a position for concealing its face, and means operable from a distant point for releasing said latch and for swinging the sign to an exposed position.

2. In a signaling device of the class described, a rotatable member carrying a sign and a signal, means for supporting said rotatable member on a vehicle, and in a position wherein the sign is concealed, a latch coöperating directly with said rotatable member so as to retain the sign in the normally concealed position, and means for rotating the rotatable member in an arc of a circle so as to expose the sign to view rearwardly of a vehicle, said latch being released by said operating means.

3. In a signaling device of the class described, the combination of a pivoted member provided with a sign, a pulley fast with the pivot of said member, a lever, a cable attached to said pulley and said lever, means for operating the lever, and a latch coöperating with the pivoted member and operated by the cable.

4. In a signal device of the class described, a supporting fixture adapted to be attached to a vehicle, a pivoted carrying member provided with an illuminated sign and a signal, a flexible element for operating said carrying member, a latch mounted on said fixture and coöperating with said carrying member whereby the latter is retained in a position to conceal the sign, said latch being operated by said flexible element, and means acting on the latch for holding it in the path of the pivoted carrying member.

5. In a signaling device of the class described, a rotatable member carrying a signal and a sign, means for supporting said rotatable member in a position wherein the sign is concealed from view at the rear of the vehicle, a member movable to different positions and operating a controller for the rotatable member, means connecting said movable member to the rotatable member and locking means coöperating with the rotatable member for holding it against movement when it occupies a position wherein the sign is concealed, said locking means coöperating with and adapted to be automatically released by the means connecting the movable member with the rotatable member when the former is actuated to operate the latter.

6. In a signaling device of the class described, a rotatable member carrying a signal and a sign, means for pivotally supporting said rotatable member on a vehicle and in a position wherein the sign is concealed and the signal is exposed to view, a prime mover for supplying the power for moving said rotatable member, means for transmitting the power from the prime mover to the rotatable member whereby the rotatable member may be moved so that the sign is shifted from its normally concealed position to an exposed position, and locking means coöperating with the transmitting means and with the rotatable member for positively retaining the sign in its normally concealed position.

7. In a signaling device of the class described, a rotatable member carrying a sign and a signal, means for supporting the rotatable member on the rear part of a vehicle and normally in a position wherein the sign is concealed and the signal is exposed, a prime mover for operating the rotatable member so as to move the sign from its normally concealed position to an exposed position, means transmitting power from the prime mover to the rotatable member, and locking means for positively retaining the rotatable member in the position wherein the sign is in said normally concealed position, said locking means being controllable by the transmitting means to release said locking means and allow the rotatable member to be shifted to a position to expose the sign.

8. In a signaling device of the class described, a sign supported for pivotal movement, means for pivotally supporting said sign on a vehicle, means operable through a flexible cable for imparting rotative movement to the sign, and a yieldable latch operating to lock the rotatable sign in a position wherein it is normally concealed, said latch being releasable by the flexible cable of the sign operating means.

In testimony whereof I have signed my name to this specification in the presence of two subscribing witnesses.

WILLIAM J. BURKE.

Witnesses:
H. I. BERNHARD,
M. C. POWELL.